United States Patent
Haroun et al.

(10) Patent No.: US 11,007,453 B2
(45) Date of Patent: May 18, 2021

(54) GAS-DISTRIBUTING TRAY FOR THE BOTTOM OF A GAS/LIQUID CONTACT COLUMN COMPRISING A ZONE FOR COLLECTING LIQUID PARTIALLY OVERLAPPED BY GAS CHIMNEYS

(71) Applicant: IFP Energies Nouvelles, Rueil-Malmaison (FR)

(72) Inventors: Yacine Haroun, Lyons (FR); Rim Brahem, Lyons (FR)

(73) Assignee: IFP Energies Nouvelles, Rueil Malmaison (FR)

( * ) Notice: Subject to any disclaimer, the term of this patent is extended or adjusted under 35 U.S.C. 154(b) by 252 days.

(21) Appl. No.: 16/202,757

(22) Filed: Nov. 28, 2018

(65) Prior Publication Data
US 2019/0168131 A1  Jun. 6, 2019

(30) Foreign Application Priority Data
Nov. 30, 2017  (FR) ..................... 1761469

(51) Int. Cl.
*B01D 3/20* (2006.01)
*B01D 3/32* (2006.01)
*B01D 53/18* (2006.01)
*B01D 3/00* (2006.01)
*B01D 3/24* (2006.01)
(Continued)

(52) U.S. Cl.
CPC ............ *B01D 3/324* (2013.01); *B01D 3/00* (2013.01); *B01D 3/008* (2013.01); *B01D 3/24* (2013.01); *B01D 53/1475* (2013.01); *B01D 53/18* (2013.01); *B01D 53/263* (2013.01)

(58) Field of Classification Search
CPC . B01D 3/00; B01D 3/008; B01D 3/24; B01D 3/324; B01D 53/1475; B01D 53/18; B01D 53/263
USPC ..................................... 261/96, 109
See application file for complete search history.

(56) References Cited

U.S. PATENT DOCUMENTS 1,821,619 A * 9/1931 Day ................. B01D 3/205
                                                261/114.2
3,637,195 A * 1/1972 Blazer ................. F28C 1/02
                                                261/30
(Continued)

FOREIGN PATENT DOCUMENTS

GB         690795 A    4/1953
WO    2014/070352 A1   5/2014

OTHER PUBLICATIONS

Search Report dated Jun. 29, 2018 issued in corresponding FR 1761469 application (2 pages).

*Primary Examiner* — Charles S Bushey
(74) *Attorney, Agent, or Firm* — Millen, White, Zelano and Branigan, P.C.

(57) ABSTRACT

A gas-distributing tray (20) and a column for exchange of heat and/or of material between a gas and a liquid containing the tray, and use of the tray, the tray having several protruding chimneys (80) which are substantially parallelepipedal and parallel to one another over a portion (21) of the upper face of the tray for the exclusive passage of the gas (g) through the tray and a zone for collecting the liquid (90) having two diametrically opposite weirs (91, 92) for collecting the liquid (l) on the tray. The chimneys each have an element for distribution of the gas (82) partially overlapping the zone for collecting the liquid.

17 Claims, 4 Drawing Sheets

(51) Int. Cl.
    *B01D 53/14*        (2006.01)
    *B01D 53/26*        (2006.01)

(56) References Cited

U.S. PATENT DOCUMENTS

| | | | |
|---|---|---|---|
| 6,123,323 A * | 9/2000 | Yoneda | B01D 3/16 |
| | | | 261/113 |
| 6,527,258 B2 | 3/2003 | Bartlok | |
| 8,083,901 B2 * | 12/2011 | Sharma | B01D 3/20 |
| | | | 202/158 |
| 9,089,787 B2 | 7/2015 | Nieuwoudt et al. | |
| 9,909,824 B2 | 3/2018 | Nieuwoudt et al. | |
| 9,919,237 B2 | 3/2018 | Moorkanikkara et al. | |
| 10,471,369 B2 * | 11/2019 | Hammon | B01D 3/205 |
| 2002/0079597 A1 | 6/2002 | Bartlok | |
| 2014/0166110 A1 | 6/2014 | Nieuwoudt et al. | |
| 2015/0231526 A1 | 8/2015 | Moorkanikkara et al. | |
| 2015/0330726 A1 | 11/2015 | Nieuwoudt et al. | |
| 2018/0140966 A1 * | 5/2018 | Brahem | B01D 3/008 |
| 2019/0184331 A1 * | 6/2019 | Haroun | B01J 19/30 |

\* cited by examiner

GAS-DISTRIBUTING TRAY FOR THE BOTTOM OF A GAS/LIQUID CONTACT COLUMN COMPRISING A ZONE FOR COLLECTING LIQUID PARTIALLY OVERLAPPED BY GAS CHIMNEYS

FIELD OF THE INVENTION

The present invention relates to the field of gas distributors for gas/liquid contact columns and more particularly to the columns for units for the treatment of gas, for the capturing of carbon dioxide ($CO_2$) or for the dehydration of a gas.

GENERAL CONTEXT

Units for the treatment of gas and/or for the capturing of $CO_2$ by washing with amines and/or for distillation and/or for dehydration comprise columns for exchange of material and/or heat between a gas and a liquid. They can, for example, be columns for the absorption and regeneration of liquid or gaseous fluids. These columns operate in countercurrentwise or cocurrentwise gas/liquid flow.

In the present description, these columns for exchange of material and/or heat between a gas and a liquid are denoted without distinction as gas/liquid exchange columns or gas/liquid contact columns.

The gas/liquid contact columns used in these units for the treatment of gas and/or for the capturing of $CO_2$ and/or for distillation and/or for dehydration generally operate on the principle of an exchange of material and/or of heat between the gas and the fluid which circulate in the columns.

When it is a matter of removing contaminants present in the gas, such as $CO_2$, water, hydrogen sulfide ($H_2S$) or carbonyl sulfide (COS), by processes of washing with a liquid, use is generally made of vertical gas/liquid contact columns which wash an ascending gas stream by countercurrentwise circulation with a descending liquid stream. Thus, the contaminants of the gas are retained by the liquid during the rise of the gas in the column with variable absorption rates. In the context of the absorption of contaminants in a gas, vertical contact column is also understood to mean regeneration towers, in which solvents (liquids) laden with contaminants are purified by contact with a gas, which favours the extraction of the contaminants present in the solution laden with contaminants. The units are generally composed of two gas/liquid contact columns, one devoted to the absorption of the contaminants, such as acid compounds in the gaseous form, by the solvent flowing along the absorption column, also known as absorber, and the other being devoted to the regeneration ("regenerator") of the solvent containing the contaminants resulting from the first gas/liquid contact column, also known as enriched solvent, for example by contributing heat in the form of boiling the said solvent, so as to completely purify the solvent, which is then reused in the absorber. This regenerated solvent is also known as depleted solvent.

There exists a great variety of types of gas/liquid contact columns.

FIG. 1 represents a possible implementation of a column for exchange of material and/or heat between a gas and a liquid, for example in the context of the absorption of acid compounds present in the gas by the liquid, which is an aqueous solution of amine(s). It is a vertical gas/liquid contact column comprising contact internals of random packing and/or structured packing type and employing several beds of packings with intermediate redistribution of the liquid stream.

The "random" packings and the "structured" packings form the two main families of packings currently available. A packing of random type consists of a multiplicity of singular solid elements, possibly identical and generally of moderate size (of the order of a centimetre), randomly deposited within the contactors, while a packing of structured type is generally formed by steel sheets shaped and arranged in a specific manner.

As represented in FIG. 1, the gas/liquid contact column 1 contains random and/or structured packing disseminated in several packing beds 7. The contact column 1 receives the gaseous fluid to be treated (FTBT), containing acid compounds to be removed, at the column bottom, and the depleted solvent DS (liquid solution of amine(s)) at the column top. The gaseous fluid to be treated FTBT is generally introduced at the column bottom using a gas distributor 2 which makes it possible to render the velocity profile of the ascending gas as uniform as possible over the whole of the lower section of the packing bed 7 in order to improve the operational performance qualities of the column. The contact column 1 delivers the treated gaseous fluid TF, purified of a part of the acid compounds, at the column top, and the enriched solvent ES, laden with a part of the acid compounds present in the gaseous fluid to be treated, at the column bottom. The transfer of the acid compounds from the gaseous fluid to the liquid solvent is carried out by bringing the descending liquid phase and the ascending vapour phase into intimate contact within the column, at the packing beds 7. The packing beds 7 are composed of solid elements which exhibit a high contact surface area, over which the liquid is uniformly disseminated and flows downwards, which favours the contact with the ascending vapour phase, and thus makes it possible to efficiently transfer material and/or heat between the two fluids.

For all the types of packing, in order to have available the entire surface area developed by the transfer internal, it is advisable for each of the streams moving about countercurrentwise to flow in as uniform a manner as possible over the whole of the section of the column, and contact internals of the column. To this end, the depleted solvent DS, at the column top, is injected uniformly over the section of the top packing bed 7, using a liquid distributor 3, and the gas to be treated FTBT is introduced at the contactor bottom using the gas distributor 2. The column 1 also comprises a plurality of liquid collecting and redistribution systems (4,5) between the packing beds 7. The column 1 represented thus comprises two such liquid collecting and redistribution systems (4,5), each been placed between two successive packing beds 7, making it possible, on the one hand, to collect the descending liquid originating from the upper packing bed and to distribute the said liquid over the lower packing bed and, on the other hand, to uniformly distribute the gas originating from the lower liquid packing bed over the upper packing bed. This configuration is particularly well suited when a high gas/liquid contact height is required. These intermediate liquid collecting and redistribution systems, in this instance installed between two packing beds 7, can be of different types, such as, for example, systems comprising a liquid-collecting tray 4 comprising chimneys for the passage of the gas, combined with a distributor 5 comprising a vertical conduit emerging over a plurality of sprinklers (horizontal pipes equipped with orifices or nozzles) for the distribution of the liquid collected on the tray 4.

In general, the gas distributor 2 positioned at the bottom of the column also collects the liquid ES, which can subsequently be extracted at the bottom of column 1. The liquid ES is generally collected in a liquid-collecting zone provided on the gas distributor 2, the said zone being conventionally connected to the bottom of the column via legs emerging in a liquid guard zone from where the liquid is withdrawn from the column 1.

The present invention relates in particular to such a device for the distribution of gas and collecting of liquid, positioned at the bottom of a column for exchange of material and/or of heat between a gas and a liquid. Such a device does not have the role of the redistribution of liquid, such as the intermediate liquid collecting and redistribution systems between packing beds illustrated in FIG. 1.

As mentioned above in the description of the column represented in FIG. 1, a good distribution of the gas and liquid phases is important in providing good operability of the column and also efficient transfer of material and/or of heat, guaranteeing that the specifications required for the products (e.g., treated gaseous fluid TF purified of a part of the acid compounds, such as $CO_2$, $H_2S$, COS) are observed.

In particular, the quality of the distribution of the gas becomes better as the diameter of the column increases and as the packing used to bring the gas and the liquid into contact becomes more capacitive. Capacitive packing is understood to mean a packing having a high capacity. Capacity of a packing refers to the maximum amount of gas which can circulate without obstructing the column, with respect to a given liquid flow rate, that is to say without creating an accumulation of liquid in a part of the packing. The capacity of a packing depends on numerous factors (angle of the channels, shapes of the elements, and the like); it is generally inversely proportional to its specific surface (also known as geometric area), which is the contact surface area per unit of volume (expressed in $m^2/m^3$). This is because the use of a capacitive packing makes it possible to delay the phenomenon of obstruction of the column and also makes it possible to reduce the pressure drop per unit length in the packing. Pressure drop per unit length is understood to mean the total pressure drop of the packing in relation to its height.

Thus, more particularly for large-diameter columns for exchange of material and/or of heat between a gas and a liquid, typically having a diameter of greater than or equal to 1 m, the system for distribution of the gas at the column bottom proves to be important.

Among the existing systems for distribution of the gas at the column bottom, chimney trays are widely employed. Such a type of gas distributor is illustrated in FIG. 2. An example of such a distributor is, for example, sold by Sulzer Chemtech and proposed in the commercial document "Internals for packed columns" (Sulzer Chemtech, Commercial Brochure 22.51.06.40-V.13, page 16). In this type of gas distributor, a tray 2 is provided with several chimneys 8 for the passage of the gas through the tray 2. According to a countercurrent operating mode of the column, each chimney 8 makes possible the passage of the gas from the bottom part of the column towards the top part of the column. The chimneys 8 protrude from one face of the tray 2, more specifically the upper face of the tray 2 directed towards the top of the column, and are positioned orthogonally to the plane formed by the tray 2. Each chimney 8 is formed of several walls which delimit an internal volume open on either side of the tray 2. For each chimney 8, the opening for escape of the gas located on the upper face of the tray 2 is surmounted by a cap 8' which makes it possible to prevent the liquid from passing into the chimneys 8 while allowing the gas to pass via a space left between the cap 8' and the chimney 8. The tray 2 also comprises a zone for collecting 9 the liquid for the recovery of the liquid descending in the column and falling onto the tray 2 between the chimneys 8. This collecting zone 9 is a cavity of the tray 2 located at its periphery, delimited on one side by a weir 9', which correspond to a vertical portion of the tray, and on another side by the wall of the shell of the column to which the tray 2 will be attached. This collecting zone 9 is generally connected to a lower zone of the column where a liquid guard is formed and from where the liquid can be extracted from the column (not represented).

The tray 2 has a circular general shape, according to a top view, and comprises a first flat portion 2' supporting the chimneys 8, having a truncated circle shape, according to a top view, a second flat portion 9" substantially parallel to the first flat portion, located at a lower level than that of the first portion of the tray and connected to the first portion via the weir 9', which is a third flat orthogonal portion of the tray. The collecting zone 9 is thus the volume formed in part by the weir 9' and the second flat portion 9" of the tray, the other part being the wall of the shell of the column (not represented).

On the tray 2 represented, 12 chimneys in rectangular parallelepiped form, laid out along an axis parallel to the plane formed by the weir 9', are thus positioned in a way aligned in pairs on either side of a central conduit dividing the first portion of the tray into two equal parts, the said conduit emerging in the collecting region 9 delimited by the weir 9' and the second lower flat portion 9" of the tray.

In other gas distributors of chimney tray type according to the prior art, the chimneys for passage of the gas can have other shapes and another arrangement than those of the gas distributor tray illustrated in FIG. 2, for example a cylindrical shape. It is the same for the caps covering the chimneys, which can have other shapes, or for the zone for collecting the liquid, which can be positioned over the entire periphery of the tray or be divided into two zones at the periphery of the tray which are diametrically opposite.

However, the gas distributors of chimney tray type according to the prior art are not always satisfactory and may exhibit gas velocities which are not completely homogeneous, in particular on the edges of such trays, this becoming more accentuated as the diameter of the column increases.

In addition, it is always desired to reduce the height of a column, in particular constrained by the size of the internals which it contains, and of which the gas distributor placed at the column bottom forms part.

OBJECTIVES AND SUMMARY OF THE INVENTION

The present invention is thus targeted at providing an improved gas distributor of chimney tray type, in particular to be used in the case of large-diameter columns (typically with a diameter at least equal to 1 m), making possible in particular better homogenization of the gas velocity downstream of the distributor (downstream being defined with respect to the direction of the gas stream ascending in the column), while minimizing the bulkiness, that is to say the height of the gas distributor and thus of the column in which is incorporated.

Thus, in order to achieve at least one of the objectives targeted above, among others, the present invention provides, according to a first aspect, a gas-distributing tray for a column for exchange of heat and/or of material between a gas and a liquid comprising an upper face and a lower face, a plurality of protruding chimneys which are substantially parallelepipedal and parallel to one another over a portion of the upper face of the tray for the exclusive passage of the gas through the tray, and a zone for collecting the liquid comprising two diametrically opposite weirs for collecting the liquid on the tray, the chimneys each comprising an element for distribution of the gas of the same shape as the chimney, the element for distribution of the gas of at least one of the said chimneys partially overlapping the zone for collecting the said liquid.

According to one embodiment, the chimneys have substantially a right-angled parallelepiped shape.

According to one embodiment, the chimneys extend between the weirs.

According to one embodiment, the length of the element for distribution of the gas of at least one of the said chimneys is greater than the width of the portion of the upper face of the tray supporting the chimneys, which is defined as being the distance separating the two diametrically opposite weirs.

According to one embodiment, each chimney additionally comprises a raising chamber on which the element for distribution of the gas rests, the element for distribution of the gas thus being raised with respect to the said portion of the upper face of the tray, preferably by a height ($h_2$) of between 0 and 0.20 m.

Preferably, the length of the raising chamber of each chimney is less than or equal to the width of the portion of the upper face of the tray supporting the chimneys, which is defined as being the distance separating the two weirs, and is less than or equal to the length of the element for distribution of the gas.

According to one embodiment, the element for distribution of the gas of the chimneys is surmounted by a cap for preventing the passage of the liquid through the chimneys, the cap being raised with respect to the top of the element for distribution of the gas so as to leave a space for the passage of the gas.

According to one embodiment, at least one of the chimneys, and preferably all of the chimneys, comprises an element which is dispersive with respect to the gas positioned inside the element for distribution of the gas of the chimney.

The dispersive element can comprise a perforated plate comprising circular orifices or slits for the passage of the gas.

The dispersive element can comprise a random or structured packing, preferably uniformly disseminated inside the element for distribution of the gas of the chimney in the direction of its height and along a plane orthogonal to its height.

According to one embodiment, the two weirs are located at the periphery of the tray in two diametrically opposite zones of the tray and are orthogonal to the portion of the upper face of the tray supporting the chimneys.

According to one embodiment, the collecting zone comprises two distinct volumes, each volume being partially delimited by one of the two weirs and a basal portion of the tray.

According to one embodiment, the tray comprises between 2 and 100 chimneys.

According to a second aspect, the present invention relates to a column for exchange of heat and/or of material between a gas and a liquid, comprising at least one gas/liquid contactor which brings the gas and the liquid into contact and at least one gas-distributing tray according to the invention, positioned at the bottom of the column upstream of any gas/liquid contactor in order to distribute the gas at the base of the gas/liquid contactor.

According to a second aspect, the present invention relates to the use of a column according to the invention for a process for the treatment of gas, for capturing $CO_2$, for the dehydration of a gas or for distillation.

Other subject-matters and advantages of the invention will become apparent on reading the description which follows of specific exemplary embodiments of the invention, given by way of nonlimiting examples, the description being made with reference to the appended figures described below.

In the figures, the same references denote identical or analogous elements.

DESCRIPTION OF THE INVENTION

The present invention relates to a gas-distributing tray for a column for exchange of heat and/or of material between a gas and a liquid, comprising a plurality of protruding chimneys over a portion of the upper face of the tray for the exclusive passage of the gas through the tray and a zone for collecting the liquid comprising diametrically opposite weirs for collecting the liquid on the tray. The chimneys have substantially a, preferably right-angled, parallelepiped shape, are positioned parallel to one another and each comprise an element for distribution of the gas of the same shape as the chimney. The element for distribution of the gas of at least one of the chimneys partially overlaps the zone for collecting the liquid.

By virtue of this overlapping, the gas-distributing tray according to the invention exhibits a high surface area open to the passage of the gas, making it possible to provide better quality of distribution of the gas. It is thus distinguished from the known gas distributors, in which the chimneys are restricted to a zone for distribution of the gas without overlapping with the zone for collecting the liquid.

The distributing tray according to the invention is also compact in height by virtue of this overlapping. This is because such an overlapping makes possible better flexibility regarding the proportioning of the collecting zone and in particular a design of the tray which is more compact in height. For a given volume of the zone for collecting the liquid, the height of the zone for collecting the liquid of the distributing tray according to the invention can be reduced as the surface area of the collecting zone can be increased, owing to the fact that the surface of opening to the passage of the gas partially overlaps the surface of the zone for collecting the liquid.

The gas-distributing tray according to the invention is appropriate to being employed at the bottom of a column for exchange of heat and/or of material between a gas and a liquid operating according to a countercurrentwise flow, the gas rising from the bottom of the column through the chimneys of the gas-distributing tray for the exclusive passage of the gas and the descending liquid being collected in the zone for collecting the liquid, which can then be subsequently discharged out of the said column.

FIGS. 3 to 6 illustrate a nonlimiting example of distributing tray according to the invention.

Figure 3:
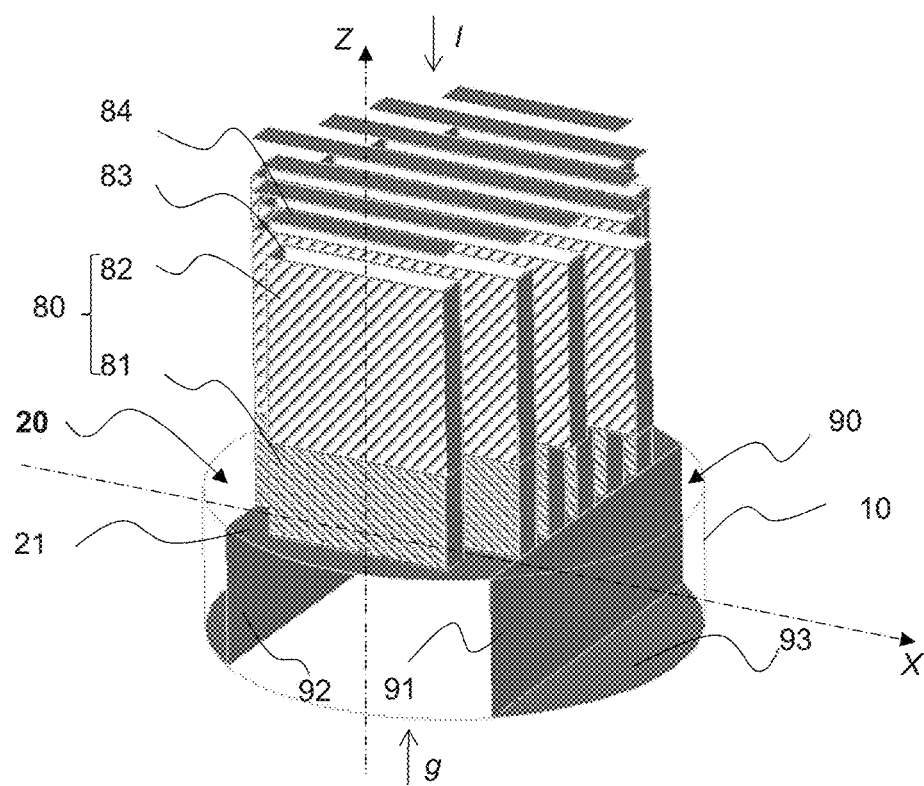
FIG. 3 is a perspective view illustrating a gas-distributing tray according to an embodiment of the invention.

The gas-distributing tray 20 is represented according to a perspective view in FIG. 3, in its position of use within a gas/liquid contact column, a portion of which is represented in FIG. 3 in the form of a cylindrical section 10. Conventionally, the gas-distributing tray 20 is inscribed in a cylinder of diameter $\phi$, which is substantially equal to that of the gas/liquid contact column. The diameter $\phi$ of the cylinder in which the gas-distributing tray 20 is inscribed is referenced in FIGS. 5 and 6. The tray according to the invention is well suited to being used in columns of large diameter, typically of greater than or equal to 1 m, preferably of greater than or equal to 3 m, and which can reach from 7 to 8 m. The gas-distributing tray 20 according to the invention is thus intended to be attached to the bottom of the column 10, in a horizontal position, upstream of any gas/liquid contactor, e.g. a packing bed, for the distribution of the gas originating from the bottom of the column over the whole of the lower section of the gas/liquid contactor. For a better understanding of the operation of such a distributing tray 20, arrows illustrate the direction of the flow of the ascending gas g and of the descending liquid l.

The gas-distributing tray 20 comprises a plurality of chimneys 80, for example 7 chimneys 80 as represented in the figures, for the exclusive passage of the gas g through the tray 20. Plurality of chimneys is understood to mean at least two chimneys. The number of chimneys is variable and depends on the design of the tray, in particular on parameters such as the size of the tray, the degree of opening desired, the volume of the collecting zone, and the like. Solely by way of indication, without any limitation, the gas-distributing tray 20 can comprise between 2 and 100 chimneys 80. The chimneys 80 protrude over a portion 21 of the upper face of the tray.

Upper face of the gas-distributing tray 20 refers to the face of the distributing tray which is directed towards the top of the exchange column. In contrast, the lower face of the distributing tray 20 is that directed towards the bottom of the column by which the gas to be distributed arrives.

The chimneys 80 are substantially parallelepipedal, for example in right-angled parallelepiped form, as represented, and are positioned parallel to one another. Preferably, a regular spacing separates the chimneys 80. Such a form of the chimneys makes possible a wide opening to the passage of the gas, in particular in comparison with known cylindrical chimneys, which makes it possible to limit the pressure drops.

The distributing tray also comprises a zone for collecting the liquid 90 comprising two diametrically opposite weirs (91, 92) for the collecting of the liquid l on the tray 20.

Weir is understood to mean a portion of the tray which is inclined, typically substantially orthogonal, with respect to the portion 21 of the upper face of the tray 20 supporting the chimneys 80, which is positioned at the periphery of the tray and which makes it possible for the liquid l to pour out towards the base 93 of the tray located at a lower elevation than that of the portion 21 of the upper face of the tray 20. The elevations are evaluated when the tray 20 is in the non-inclined position (i.e. portion 21 of the tray supporting the chimneys in a substantially horizontal plane) and positioned so that a vertical axis Z passes through the chimneys 80 positioned on the tray, corresponding to the position of use of the tray in the gas/liquid exchange column. This is transposable to all the elevations mentioned in the present description.

According to the invention, the weirs (91, 92) are preferably located at the periphery of the gas-distributing tray in two diametrically opposite zones, and are orthogonal to the portion 21 supporting the chimneys 80. These are, for example, flat plates connecting the portion 21 which is the support of the chimneys 80 and the base 93 of the distributing tray 20, orthogonal to the planes formed by the portion 21 and the base 93 of the tray 20.

The collecting zone 90 is equivalent to a volume which can be calculated from the diameter $\phi$ of the cylinder in which the gas-distributing tray 20 is inscribed, from the height $h_1$ of the collecting zone defined between the base 93 of the tray and the portion 21 which is the support of the chimneys, and from the width L of the portion 21 of the tray.

The collecting zone 90 preferably comprises, and in particular consists of, two distinct volumes, each volume being partially delimited by one of the two weirs and a basal portion 93 of the tray. When the tray is positioned in the gas/liquid contact column, each of the two volumes is then also delimited by the internal wall of the column to which the tray is attached. The two volumes are open towards the top of the tray, that is to say on the side of the chimneys 80, so as to collect the liquid l, and closed towards the bottom of the tray, that is to say at the level of the base 93 of the tray. Means for discharging the liquid collected, such as openings in the tray and pipes, not represented, can be provided in the collecting zone 90, in particular in the two volumes of the collecting zone. Thus, the liquid can be discharged from the collecting zone towards the bottom of the column in a zone of the column where a liquid guard is formed and from where it can subsequently be extracted out of the column.

According to the embodiment illustrated in FIGS. 3 to 6, each chimney 80 comprises an element for distribution of the gas 82 and a raising chamber 81 on which the element for distribution of the gas 82 rests. The element for distribution of the gas 82 is thus raised with respect to the portion 21 of the upper face of the gas-distributing tray 20 by a height $h_2$, which is the height of the raising chamber 81, as is clearly represented in FIG. 5. Raised element is understood to mean that the base of the said element is at a higher level (elevation) with respect to a reference surface. For example, an element for distribution of the gas 82 raised by a height $h_2$ with respect to the portion 21 means that the base of the said distributing element 82 is found at a height $h_2$ from the surface 21. The element for distribution of the gas 82 and the raising chamber 81 have the same shape, which is that of the chimney, that is to say a, preferably right-angled, parallelepiped shape. The presence of such raising chambers can in particular facilitate the manufacture of the trays according to the invention by allowing greater flexibility for the attachment of the elements for distribution of the gas to the surface of the tray. According to another embodiment which is not illustrated, the chimneys 80 do not comprise a raising chamber and the element for distribution of the gas 82 forms the main body of the chimney, resting directly on the portion 21 of the upper face of the tray 20.

According to the invention, the element for distribution of the gas 82 of at least one of the chimneys 80 partially overlaps the zone for collecting the liquid 90. More specifically, the element for distribution of the gas 82 partially overlaps the region for collecting the liquid 90, that is to say the zone which recovers the liquid descending in the column and falling onto the portion 21 of the tray 20 between the chimneys 80, this collecting zone preferably being formed by the two distinct volumes formed between the basal portion of the tray 93 and the weirs (91, 92). The element for distribution of the gas 82 thus juts out from the portion 21 of the tray over the said collecting zone (90).

The raised element for distribution of the gas 82 is located at higher elevations than those of the raising chamber 81 of the chimney 80. It thus constitutes an upper part of the chimney and the raising chamber 81 constitutes a lower part of the chimney. As illustrated in particular in FIG. 5, the raising chamber 81 of the chimney 80 has a height $h_2$, preferably smaller than the height $h_3$ of the element for distribution of the gas 82 of the chimney. As nonlimiting example, the height $h_2$ of the raising chamber 81 of the chimney can be between 0 and 0.20 m, preferably between 0.005 m and 0.20 m and more preferably between 0.005 m and 0.05 m. Likewise, as nonlimiting example, the height $h_3$ of the element for distribution of the gas 82 can be between 0.15 m and 1.00 m and preferably between 0.2 m and 0.6 m.

The raising chamber 81 of the chimney comprises, at its base, the arrival opening for the gas g originating from the lower part of the distributing tray 20, and the element for distribution of the gas 82 of the chimney comprises, at its top, the opening for escape of the gas which has passed through the chimney 80. In the embodiment where the chimneys do not comprise raising chambers, the element for distribution of the gas 82 comprises, at its base, the arrival opening for the gas g originating from the lower part of the distributing tray 20.

According to the invention, given that the element for distribution of the gas 82 of at least one of the chimneys 80, for example of the three central chimneys as represented, partially overlaps the zone for collecting the liquid 90, the distributing tray exhibits a surface area open to the passage of the gas which is improved with respect to the gas-distributing trays according to the prior art, in particular with respect to gas-distributing trays according to the prior art having chimneys in right-angled parallelogram form without overlapping of the collecting zone. Such an improved surface area for passage to the gas makes possible better homogenization of the gas velocity downstream of the gas-distributing tray.

The surface area open to the passage of the gas can be quantified by the degree of opening to the passage of the gas, defined in the present description as the ratio of the total surface area formed by the openings for escape of the gas at the top of the chimneys 80 (i.e. at the top of the element for distribution of the gas 82 of the chimneys 80) to the total surface area of the gas-distributing tray 20, the said total surface area of the tray conventionally being that of a circle for a tray which is inscribed in a cylinder, the diameter $\phi$ of which is that of the gas/liquid contact column.

Further details are given below regarding the overlapping of a part of the collecting zone 90 by the element for distribution of the gas 82 of at least one chimney 80 of the gas-distributing tray.

The chimneys 80 in, preferably right-angled, parallelepiped form advantageously extend between the weirs (91, 92). They are thus extended along an axis X orthogonal to the planes formed by the weirs (91,92).

Advantageously, the length of the element for distribution of the gas 82 of at least one of the chimneys 80 is greater than the width L of the portion 21 of the upper face of the tray 20 supporting the chimneys 80. This width L of the portion 21 is defined by the distance separating the two weirs (91, 92), as clearly visible in FIGS. 5 and 6.

Advantageously, the length of the raising chamber 81 of each chimney 80 is less than or equal to the said width L of the portion 21 of the tray and is less than or equal to the length of the element for distribution of the gas 82.

Figure 4:
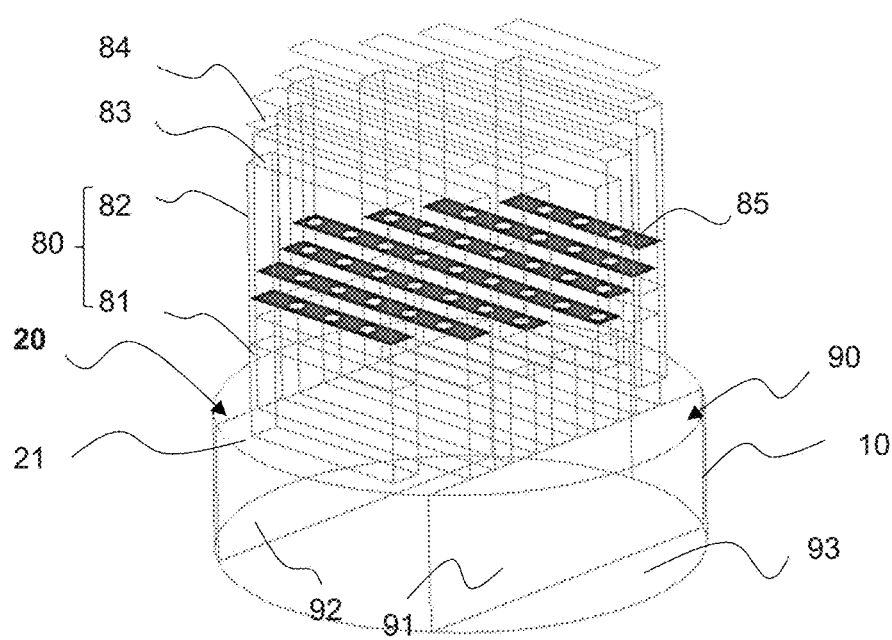
FIG. 4 is the same perspective view as FIG. 3 but represented in transparency in order to reveal the internal structure of the chimneys of the gas-distributing tray according to an embodiment of the invention.
Figure 5:
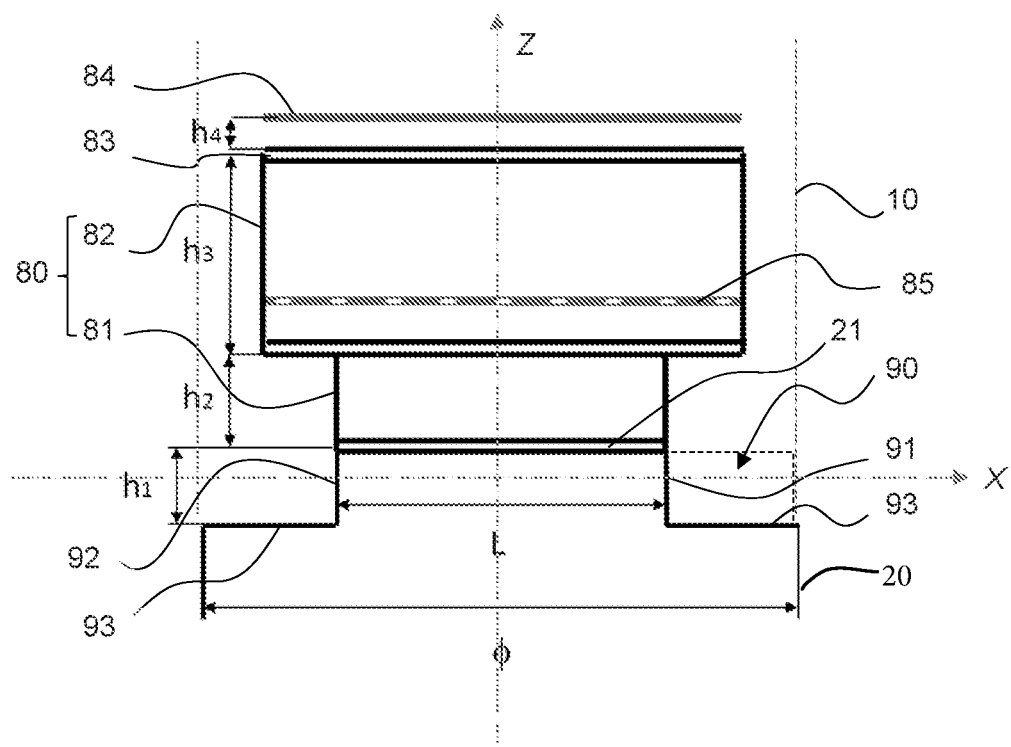
FIG. 5 is a cross-sectional view (along a section A-A' represented in FIG. 6) of the gas-distributing tray illustrated in FIG. 3.
Figure 6:
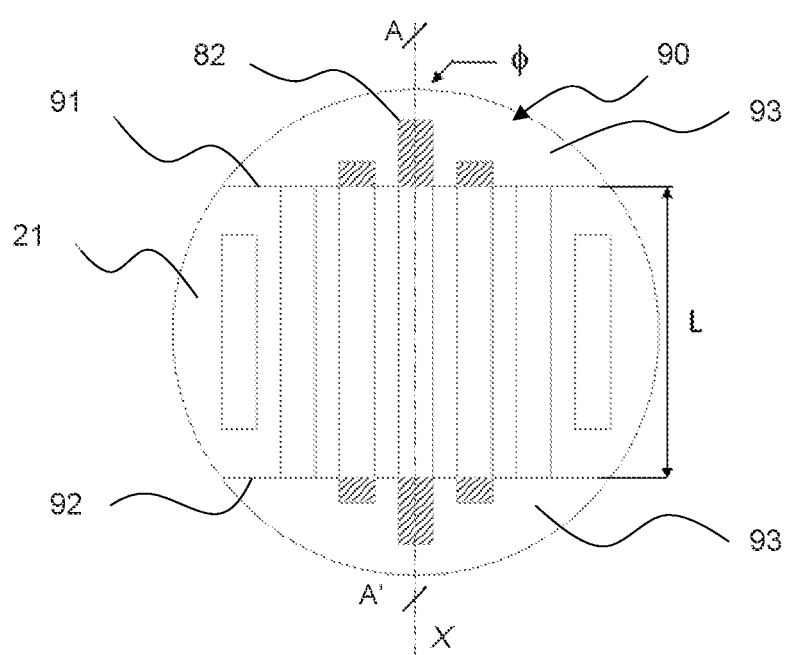
FIG. 6 is a top view of the gas-distributing tray illustrated in FIG. 3.

Thus it is that, in the tray represented in FIGS. 3 to 6, the three central chimneys have their element for distribution of the gas 82 longer than their raising chamber 81 and thus jut out over the zone for collecting the liquid 90 (overlapping surface shaded in FIG. 6). Two chimneys are found on either side of the three central chimneys, the raising chambers 81 and the elements for distribution of the gas 82 of which have substantially the same length, the said length being less than or equal to the width L of the portion 21 of the tray.

Preferably, the element for distribution of the gas 82 of the chimneys 80 is surmounted by a cap 84 for preventing the passage of the liquid l through the chimneys. The cap 84 is raised with respect to the top of the element for distribution of the gas 82 by a given height $h_4$, as visible in FIG. 5, so as to leave a space for the passage of the gas g. Without being limited to this example, the cap can be a plate of the same shape as that of the chimney, for example a rectangle, as represented in FIGS. 3 to 5. The cap can alternatively have a limpet shape, a semi-cylinder shape, and the like.

Preferably, the inside of the element for distribution of the gas 82 of at least one of the chimneys 80 is provided with an element which is dispersive with respect to the gas, that is to say an element which provides dispersion of the gas as it passes through the element for distribution of the gas of the chimney, thus generating a better dissemination (within the meaning of the homogenization) of the gas in this part of the chimney and thus at the outlet of the chimney. Such a rehomogenization of the gas is particularly advantageous when the length of the element for distribution of the gas 82 of the chimney is greater than that of the raising chamber 81 of the chimney. Preferably, all the chimneys of the distributing tray are provided with such a dispersive element, so as to favour a homogenization of the gas stream downstream of the distributing tray.

This dispersive element can be positioned at the base of the element for distribution of the gas 82 of the chimney, for example in the first third of the element for distribution of the gas 82 of the chimney. By thus being closer to the base of the element for distribution of the gas 82 than to its top, the dispersive element makes it possible to redistribute the gas over the whole of the surface of the chimney, while leaving a sufficient height for the stabilization of the gas which has passed through the dispersive element.

Advantageously, the dispersive element comprises a perforated plate comprising circular orifices or slits. The example of distributing tray according to the invention represented in FIGS. 3 to 6 comprises such perforated plates 85 equipped with circular orifices, at the base of the elements for distribution of the gas 82 of each chimney 80, as is clearly visible in FIG. 4, which is a view identical to that of FIG. 3 but represented in transparency. The dispersive element can also be a random packing or packing of structured type, preferably of structured type, in particular because a structured packing makes possible a uniform density of the dispersive medium. It can also be a combination of one or more of these elements.

Random packing refers to anarchic haphazard stacks of unit elements having specific shapes, for example rings, spirals, and the like. They are generally used to perform exchanges of heat and/or of material, which are carried out within these unit elements. These unit elements can be made of metal, of ceramic, of plastic or of analogous materials. Patent Applications EP 1 478 457 and WO 2008/067031 describe two examples of random packing unit element. The random packing offers advantageous qualities in terms of efficiency of transfer, low pressure drop and simplicity of installation. The geometric area of the random packing can be between 70 and 250 $m^2/m^3$. Structured packing refers to a stack of bent or corrugated (that is to say, substantially undulating with right angles) plates or sheets arranged in an organized manner in the form of large blocks, as described in particular in Patent Applications FR 2 913 353 (US 2010/0213625), U.S. Pat. Nos. 3,679,537 and 4,296,050. They are generally used to produce exchanges of heat and/or of material, which are carried out on these plates. The structured packings have the advantage of offering a great geometric area for a given representative diameter. The geometric area of the structured packing can be between 100 and 500 $m^2/m^3$.

When a random packing or packing of structured type is concerned, the dispersive element can be disseminated inside the element for distribution of the gas 82 of the chimney or chimneys for the exclusive passage of the gas uniformly in the direction of the height of the chimney (along the axis Z) and uniformly along a plane orthogonal to the height of the chimney (along the axis X). In this way, the dispersion of the gas passing through the chimney or chimneys is as homogeneous as possible, which makes possible a gas stream at the outlet of the chimney or chimneys which is unvarying over a section corresponding to the section of the chimney or chimneys.

Still when a random packing or packing of structured type is concerned, the dispersive element can be uniformly disseminated in the element for distribution of the gas 82 of the chimney over a thickness at least equal to 5 cm in the direction of the height of the chimney. In this way, the gas particles passing through such thicknesses of dispersive material are sufficiently dispersed to provide a homogeneous gas stream at the outlet of the chimneys. The dispersive element can by also be uniformly disseminated over the entire height of the element for distribution of the gas 82 of the chimney or chimneys for the exclusive passage of the gas.

Again when a random packing or packing of structured type is concerned, this dispersive element is preferably more capacitive than the packing used as gas/liquid contactor positioned higher in the column for exchange of material and/or of heat between a gas and a liquid.

The invention also relates to a column for exchange of material and/or of heat between a gas and a liquid, in which the two fluids are brought into contact by means of at least one gas/liquid contactor. Such a gas/liquid contactor is preferably a bed of structured or random packing, as are defined above. It can also be any other means for bringing into gas/liquid contact which makes possible an exchange of material and/or of heat, such as trays.

The gas and the liquid flow in the column countercurrentwise, in particular with an ascending gas stream and a descending liquid stream.

Figure 1:
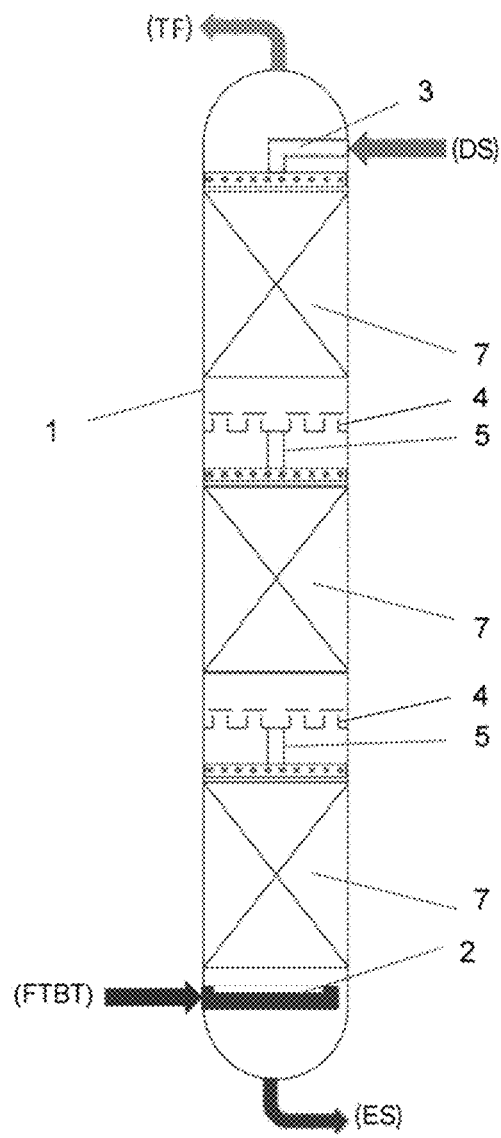
FIG. 1, which has already been described, is a diagram illustrating a specific case of a gas/liquid contact column for the absorption of acid compounds present in a gas by an aqueous amine solution, in the context of the treatment of gas or of capture of $CO_2$, equipped with a distributing tray according to the prior art or according to the invention.
Figure 2:
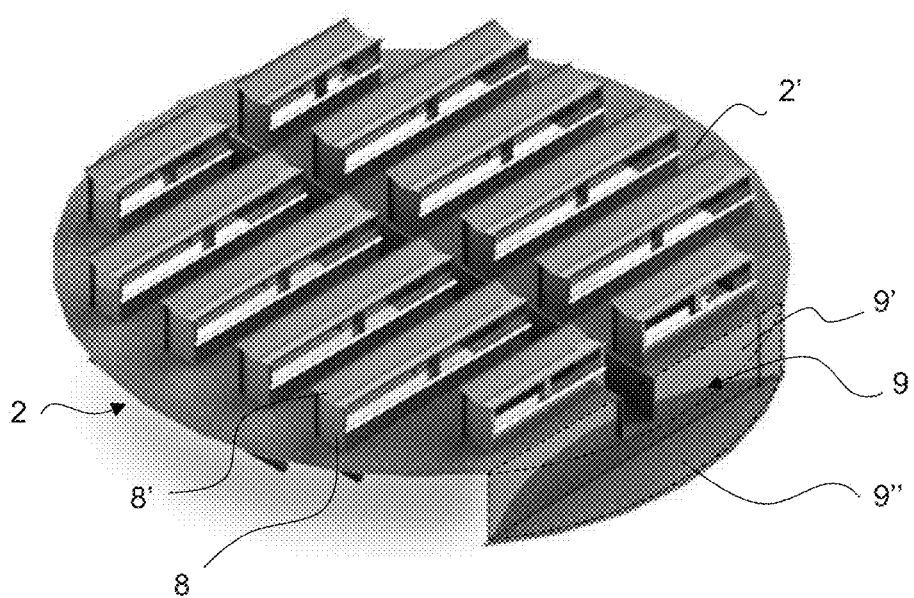
FIG. 2, which has already been described, illustrates a gas distributor of chimney tray type according to the prior art capable of being placed at the bottom of a gas/liquid contact column.

The column according to the invention can be a column as described in connection with FIG. 1, for example appropriate for a process for absorption of acid compounds, such as $CO_2$, $H_2S$, COS, carbon disulfide ($CS_2$), sulfur dioxide ($SO_2$) and mercaptans (RSH), such as methyl mercaptan ($CH_3SH$), ethyl mercaptan ($CH_3CH_2SH$) and propyl mercaptan ($CH_3CH_2CH_2SH$), present in a gas to be treated by the liquid, which is an aqueous solution of amine(s). The column can thus comprise, without exhaustively taking up again the description which has already been given above of such a column, at least one inlet for a liquid (known as "depleted solvent") positioned at the top of the column, at least one inlet for a gas to be treated at the bottom of the column, at least one outlet for the treated gas at the top of the column and at least one outlet for the liquid enriched in contaminants which are initially present in the gas to be treated at the column bottom (known as "enriched solvent"). The column advantageously comprises at least one gas/liquid contactor 7, preferably a bed of structured packing, in order to bring the gas to be treated into contact with the depleted solvent.

The column according to the invention is characterized in that it comprises a single gas-distributing tray 20, as described above, positioned at the bottom of the column upstream of any gas/liquid contactor in order to uniformly distribute the gas at the base of the said gas/contactor.

According to one embodiment of the present invention, the column comprises several sections, each section comprising a gas/liquid contactor, preferably a bed of structured or random packing.

The column according to the invention can be used in a process for the treatment of gas, in particular a process for the removal of acid compounds present in a gas by means of a liquid solution based on amine(s), for example for treating natural gas, or in a process for capturing $CO_2$, which is typically a process for the treatment of the gas by means of a liquid solution based on amine(s), for example in order to treat combustion flue gases. The column according to the invention can also be advantageously used in a process for the dehydration of a gas targeted at removing the water ("to dry") present in a gaseous effluent, such as natural gas, by bringing the gas into contact with liquid solvent, such as glycol, or again be used in a process of the distillation of liquids. Other types of solvents can be used in these processes where a column according to the invention can be used.

Without further elaboration, it is believed that one skilled in the art can, using the preceding description, utilize the present invention to its fullest extent. The preceding preferred specific embodiments are, therefore, to be construed as merely illustrative, and not limitative of the remainder of the disclosure in any way whatsoever.

In the foregoing and in the examples, all temperatures are set forth uncorrected in degrees Celsius and, all parts and percentages are by weight, unless otherwise indicated.

The entire disclosures of all applications, patents and publications, cited herein and of corresponding application No. FR 1761469, filed Nov. 30, 2017 are incorporated by reference herein.

EXAMPLE

The following example illustrates certain advantages of the present invention, on comparing the results obtained using a gas-distributing tray according to the invention and a gas-distributing tray according to the prior art, in the context of a process for the reactive absorption of acid compounds by washing with amines of the capturing of $CO_2$ type, in order to achieve a target specification of $CO_2$ content at the outlet of the absorber. The column and the process for capturing $CO_2$ exhibit the following main characteristics:

Diameter of the column: 1 m.
Solvent used: aqueous solution comprising 40% by weight of methyldiethanolamine (MDEA).
Total number of trays in the column: 5 (the gas-distributing tray at the column bottom and the liquid collecting/distributing trays included).
Height of the collecting/distributing trays: 1 m (the gas-distributing tray at the column bottom not included)
Number of beds of structured packings: 4.
Effective area of the structured packing of the beds: 250 $m^2/m^3$.
Height per bed of packing: 4 m.
Solvent flow rate: QL=46 $m^3/m^2/h$.
Gas flow rate: Fs=2 $(m/s) (kg/m^3)^{0.5}$.
Pressure: 40 bars.
Temperature: 40° C.

The exemplified distributing tray according to the invention is in accordance with that represented in FIGS. 3 to 6 and comprises 7 chimneys. The diameter of the tray is 1 m. Other geometric characteristics of the tray are summarized below in Table 1.

The gas-distributing tray according to the prior art tested differs from the present example of gas-distributing tray according to the invention in that the chimneys of right-angled parallelepiped form are extended along an axis parallel to the weirs, without possible overlapping of the collecting zone by the chimneys. It comprises 7 chimneys. Other differences relate to the dimensions of the collecting zone (and in particular the height $h_1$ of the weirs). The tray according to the prior art and the tray according to the invention have different dimensions of the collecting zone but an identical volume (0.0908 $m^3$) of the collecting zone. Other geometric characteristics of the tray according to the invention are summarized below in Table 1.

In this example, the tray according to the invention is designed so as to obtain at least the same performance qualities as those obtained with the exemplified tray according to the prior art.

Certain parameters of the gas-distributing trays tested are compared in Table 1 below.

TABLE 1

|  | Gas-distributing tray according to the prior art | Gas-distributing tray according to the invention |
| --- | --- | --- |
| φ (m) | 1 | 1 |
| $h_1$ (m) | 0.56 | 0.28 |
| $h_2$ (m) | 0 | 0 |
| $h_3$ (m) | 0.40 | 0.40 |
| $h_4$ (m) | 0.05 | 0.05 |
| L (m) | 0.68 | 0.48 |
| S (%) | 30 | 41 |
| $V/V_{SG}$ (m/s) | 2.62 | 1.92 |
| H (m) | 0.5 | 0.37 |
| $H_{total}$ (m) | 1.51 | 1.10 |

In Table 1:
φ is the diameter of the cylinder in which the tray is inscribed, regarded as being the diameter of the tray.
$h_1$ is the height of the collecting zone and more specifically of the weirs.
$h_2$ is the height of the raising chamber of the chimney.
$h_3$ is the height of the element for distribution of the gas of the chimney.
$h_4$ is the height of the space left between the top of the element for distribution of the gas of the chimney and the cap surmounting the chimney.
L is the width of the portion of the tray supporting the chimneys.
S is the degree of opening to the passage of the gas, which is the ratio of the total surface area developed by the chimneys (total surface area formed by the openings for escape of the gas at the top of the chimneys, i.e. at the top of the elements for distribution of the gas of the chimneys) to the delivering surface area of the column (total surface area of the gas-distributing tray corresponding to that of a circle having, as diameter, that of the column).
$V/V_{SG}$ is the ratio of the delivering velocity of the gas in the chimneys V (velocity of the gas inside the chimneys) to the superficial velocity of the gas in the column $V_{SG}$. A value of approximately 1 reflects a good quality of distribution of the gas. The superficial velocity of the gas in the column is the superficial empty bed velocity of the gas, understood as being the ratio of the volume flow rate of the gas at the conditions appearing in the section ($m^3/s$) of the column to the section of the column ($m^2$).
H is the height of homogenization of the gas between the gas-distributing tray and the bed of packing positioned above the gas-distributing tray within the column, which is the height separating the gas-distributing tray from the overlying bed of packing.
$H_{total}$ is the total height of the gas-distributing tray, reflecting the bulkiness of the tray.

It is noted that a high value of the degree of opening to the passage of the gas S, as is the case for the exemplified gas-distributing tray according to the invention, makes possible a better quality of distribution.

A value of approximately 1 of the ratio $V/V_{SG}$, as is the case with the exemplified gas-distributing tray according to the invention, reflects a good quality of distribution of the gas, makes it possible to reduce the height of homogenization of the streams H between the gas-distributing tray and the bed of packing positioned above the said tray, and thus to reduce the bulkiness.

A low value of the total height of the gas-distributing tray $H_{total}$, as is the case for the exemplified gas-distributing tray according to the invention, makes possible a more compact and less expensive design. A low value of $H_{total}$ also makes it possible to reduce the total height of the absorption column.

In comparison with the gas-distributing tray according to the prior art without overlapping of the collecting zone by the chimneys, the gas-distributing tray and liquid collector according to the invention make it possible to provide a better degree of opening to the passage of the gas, thus contributing to better homogenization of the gas velocity downstream of the gas-distributing tray, while exhibiting a reduced bulkiness with a gain of 27% with respect to the distributor according to the prior art, making it possible to advantageously reduce the height of the column.

The preceding examples can be repeated with similar success by substituting the generically or specifically described reactants and/or operating conditions of this invention for those used in the preceding examples.

From the foregoing description, one skilled in the art can easily ascertain the essential characteristics of this invention and, without departing from the spirit and scope thereof, can make various changes and modifications of the invention to adapt it to various usages and conditions.

The invention claimed is:

1. A gas-distributing tray (20) suitable for a column for exchange of heat and/or of material between a gas (g) and a liquid (l), said tray comprising an upper face and a lower face, a plurality of protruding chimneys (80) which are substantially parallelepipedal and parallel to one another over a portion (21) of the upper face of said tray (20) for the exclusive passage of said gas (g) through said tray (20), and a zone for collecting said liquid (90) comprising two diametrically opposite weirs (91, 92) for collecting said liquid (l) on said tray (20), said chimneys (80) each comprising an element for distribution of the gas (82) of the same shape as the chimney, said element for distribution of the gas (82) of at least one of said chimneys partially overlapping the zone for collecting said liquid (90) and the length of the element for distribution of the gas (82) of at least one of the said chimneys being greater than the width (L) of the portion (21) of the upper face of said tray supporting the chimneys (80), which is defined as being the distance separating the two weirs (91, 92).

2. The tray according to claim 1, in which said chimneys (80) have substantially a right-angled parallelepiped shape.

3. The tray according to claim 1, in which said chimneys extend between the weirs (91, 92).

4. The tray according to claim 1, in which each chimney additionally comprises a raising chamber (81) on which the element for distribution of the gas (82) rests, said element for distribution of the gas (82) thus being raised with respect to said portion (21) of the upper face of said tray (20).

5. The tray according to claim 4, wherein said element for distribution of the gas (82) is raised with respect to said portion (21) of the upper face of said tray (20) by a height ($h_2$) of between 0 and 0.20 m.

6. The tray according to claim 4, in which the length of the raising chamber (81) of each chimney (80) is less than or equal to the width (L) of the portion (21) of the upper face of said tray supporting the chimneys (80), which is defined as being the distance separating the two weirs (91, 92), and is less than or equal to the length of the element for distribution of the gas (82).

7. The tray according to claim 1, in which the element for distribution of the gas (82) of said chimneys (80) is surmounted by a cap (84) for preventing the passage of the liquid (l) through said chimneys (80), the said cap being raised with respect to the top of said element for distribution of the gas (82) so as to leave a space for the passage of the gas (g).

8. The tray according to claim 1, in which at least one of said chimneys (80) comprises an element which is dispersive with respect to the gas positioned inside the element for distribution of the gas (82) of the chimney (80).

9. The tray according to claim 8, in which said dispersive element comprises a perforated plate (85) comprising circular orifices or slits for the passage of the gas.

10. The tray according to claim 8, in which said dispersive element comprises a random or structured packing.

11. The tray according to claim 10, wherein said dispersive element comprises a random or structured packing uniformly disseminated inside the element for distribution of the gas of said chimney (80) in the direction of its height and along a plane orthogonal to its height.

12. The tray according to claim 8, wherein all said chimneys (80) comprise an element which is dispersive with respect to the gas positioned inside the element for distribution of the gas (82) of the chimney (80).

13. The tray according to claim 1, in which the two weirs (91, 92) are located at the periphery of the tray in two diametrically opposite zones of said tray (20) and are orthogonal to said portion (21) of the upper face of the tray (20) supporting the chimneys (80).

14. The tray according to claim 1, in which the collecting zone (90) comprises two distinct volumes, each volume being partially delimited by one of the two weirs and a basal portion (93) of the tray.

15. The tray according to claim 1, comprising between 2 and 100 chimneys (80).

16. A column suitable for exchange of heat and/or of material between a gas and a liquid, comprising at least one gas/liquid contactor (7) which brings the gas (g) and the liquid (l) into contact and at least one gas-distributing tray (20) according to claim 1, positioned at the bottom of the column upstream of any gas/liquid contactor (7) in order to distribute the gas at base of said gas/liquid contactor (7).

17. A process comprising the treatment of gas, for capturing $CO_2$, for the dehydration of a gas or for distillation, in a column according to claim 16.

* * * * *